United States Patent [19]
Brooks

[11] Patent Number: 5,204,672
[45] Date of Patent: Apr. 20, 1993

[54] KEYLESS ENTRY SYSTEM

[76] Inventor: James E. Brooks, 3106 Tamiami Trail #138, Naples, Fla. 33940

[21] Appl. No.: 641,162

[22] Filed: Jan. 14, 1991

Related U.S. Application Data

[63] Continuation-in-part of Ser. No. 406,757, Sep. 13, 1989, abandoned.

[51] Int. Cl.[5] .............................................. H04B 5/00
[52] U.S. Cl. .......................... 340/825.71; 340/825.31
[58] Field of Search ...................... 340/425.5, 424, 430, 340/541, 825.31, 825.32, 825.33, 825.34, 825.71; 361/179, 182

[56] References Cited

U.S. PATENT DOCUMENTS

| | | | |
|---|---|---|---|
| 4,354,189 | 10/1982 | Lemelson | 340/825.31 |
| 4,479,110 | 10/1984 | Cipri | 340/430 |
| 4,794,268 | 12/1988 | Nakano et al. | 340/825.31 |
| 4,819,050 | 4/1989 | Manzoni | 340/425.5 |
| 4,835,533 | 5/1989 | Akutsu | 340/825.31 |
| 4,897,644 | 1/1990 | Hirano | 340/825.31 |

FOREIGN PATENT DOCUMENTS 2129176  5/1984  United Kingdom ........... 340/825.34

Primary Examiner—Donald J. Yusko
Assistant Examiner—Dervis Magistre
Attorney, Agent, or Firm—William E. Noonan

[57] ABSTRACT

A keyless entry system is provided for locked or disabled items. A transmitter carried by a person generates a signal with a predetermined frequency characteristic such that the generated signal is transmitted through the carrier's body. There is a receiver apparatus including a detector for detecting a signal with the predetermined frequency characteristic and a mechanism that is engageable by the carrier's body for providing signals transmitted through the body to the detector. When such signals are detected, a circuit is activated to unlock or enable the item. An alarm system may be provided which sounds under certain predetermined conditions and a latching mechanism may be utilized to disarm the alarm under certain conditions.

17 Claims, 4 Drawing Sheets

KEYLESS ENTRY SYSTEM

RELATED APPLICATION

This application is a continuation in part of Ser. No. 406,757, filed Sep. 13, 1989, now abandoned.

FIELD OF THE INVENTION

This invention relates to a keyless entry system, and more particularly, to a keyless entry security system for unlocking and entering motor vehicle and building doors.

BACKGROUND OF THE INVENTION

Many systems are known for locking and subsequently unlocking doors, such as those used for motor vehicles, residences and other buildings. Conventional key systems have proven to be easily defeated by sophisticated thieves. As a result, a number of keyless entry systems have been introduced. However, over time, may of these systems have also been circumvented.

Conventional security systems exhibit a number of additional disadvantages. Some employ alarms which may be activated prematurely by unintended movement of the car, and which may be disabled by a knowledgeable thief. Certain keyless entry systems have employed remote radio transmitters. These systems tend to be rather complex and expensive and have not worked as reliably as required. Coded security systems are also rather complex and expensive. Moreover, it can be time consuming and tedious to operate a coded system, particularly at night or in the dark. And, if the code is forgotten, the person seeking entry can be stranded outside of the door.

Unless a keyless entry transmitter employs a fairly weak signal, its batteries will soon die. To compensate for this weak signal a large, bulky antenna must be utilized. Alternatively, the transmitter can be turned off between uses. However, this requires the user to reach into his or her pocket, purse, bag, etc. to activate the system.

A known identification system disclosed by published U.K. patent publication 2,129,176 employs a portable device such as a wrist watch that is placed in direct contact with the skin. The watch transmits a selected code through the user's body, which code is received by a touch element having decoding circuitry. Due to the weak signal that is generated, this apparatus only operates when the transmitter directly engages the skin. If the transmitter is separated from the skin (for example, when in a purse or brief case) the device does not work because the receiver does not exhibit sufficient gain to enable proper detection of the transmitted signal. Additionally, the British device employs a conventional battery to power the transmitter. Such batteries wear out in time and must be replaced. If a replacement battery is not accessible, the system is rendered inoperative.

SUMMARY OF THE INVENTION

It is therefore an object of this invention to provide a keyless entry system that provides improved security for locked doors and permits such items to be opened or accessed reliably and simply only by a user carrying a signal transmitter that generates a predetermined frequency characteristic.

It is a further object of this invention to provide a keyless entry system which is capable of extended, yet virtually continuous operation without requiring frequent battery replacement.

It is a further object of this invention to provide a keyless entry system, which is activated simply by touch and which does not require the memorization of codes or the manipulation of keys or other devices.

It is a further object of this invention to provide a keyless entry system that employs a low voltage transmitter, which relies upon the user's body as a transmitting antenna, but which does not require direct contact between the transmitter and the user's skin so that it may be conveniently carried in a briefcase, purse, pocket or similar location.

It is a further object of this invention to provide a keyless entry system, which sounds an appropriate alarm when the door is engaged or otherwise bypassed by a person without the required signal transmitter.

It is a further object of this invention to provide a keyless entry system, which reliably and automatically arms and disarms the alarm as required.

It is a further object of this invention to provide a keyless entry system, which is suitable for use of all types of locked doors, and in particular, for the doors on motor vehicles and buildings.

This invention results from a realization that a transmitter for an access control system may be activated continuously while requiring only minimal power by utilizing the carrier's body as a part of the radiating circuit or antenna which generates the radiated signal. This invention results from the further realization that such a low-powered signal may be adequately detected without having to place the transmitter in direct skin contact, by employing a detector that uses a pair of narrow bandpass filters and amplifiers connected between those filters. Such an arrangement provides a significant gain and effectively detects a largely noise free signal. Accordingly, this invention features a keyless entry system for locked doors, including signal generating means that are carried by a person at a location that is separated from the person's skin by an electrically insulating medium. A signal with a predetermined frequency characteristic is generated with sufficient strength such that the generated signal is transmitted through the carrier's body. There are receiver means including detector means for detecting a signal with the predetermined frequency characteristic and engagement means that are engageable by the carrier's body for providing signals transmitted through the body to the detector means. There are means responsive to the detector means for unlocking the door when a signal having the predetermined frequency characteristic is detected.

In a preferred embodiment the detector means includes first and second filters for passing a generated signal within the predetermined frequency range. Amplifier means are interconnected between the first and second filters for amplifying the signal that is passed by the first and second filter means. The signal generating means may include a support, an oscillator mounted on the support, piezoelectric bender means connected to the oscillator and means, responsive to movement of the housing for deflecting the bender means such that the bender means oscillate to produce a voltage. This voltage drives the oscillator to generate the output signal. The means for deflecting may include a cantilever element that is resiliently mounted at a first end to the support and has a mass attached at an opposite second end such that the cantilever element oscillates about the first end alternately toward and away from the bender means in response to movement of the housing. An actuator may be disposed between the cantilever element and the bender means for deflecting the bender means when the cantilever element moves toward the bender means.

The engagement means may include primary contact means that are selectively engageable by the carrier for receiving transmitted signals therefrom, primary switch means that are operated by engagement of the primary contact means, and means that are responsive to operation of the primary switch means for electrically interconnecting the primary contact means and detector means. Preferably, primary timing means are provided and there are means responsive to operation of the primary switch means for initiating the primary timing means and means, responsive to timing out of the primary timing means, for locking the door. The means for unlocking may include a pulse generator, means that are responsive to operation of the primary switch means for driving the pulse generator to generate an electric pulse and a solenoid that is responsive to the generation of an electric pulse from the pulse generator for unlocking the door.

The means for generating may include means for providing the output signal with a predetermined modulation and the means for detecting may include means for sensing output signals having that predetermined modulation. The means for generating may include means for establishing a predetermined frequency within the modulated signal and the means for detecting may include means for extracting the predetermined frequency from the modulated signal. The means for detecting may include means for alternately enabling the detector means to detect the output signal during a predetermined interval and disabling the detector means for a second predetermined interval if the signal is not detected during the first interval.

The system may further include alarm means and alarm control means for activating the alarm means in response to at least one predetermined alarm condition. The alarm control means may include means for latching the alarm means in a deactivated state for at least a predetermined time after the detector means sense a signal having the predetermined frequency characteristic. The means for latching typically include alarm delay timing means that are initiated when the detector means sense a signal having the predetermined frequency characteristic and latching relay means that are activated by operation of the alarm delay timing means to hold the alarm means in a deactivated state during timing out of the alarm delay timing means. The alarm control means may further include energizing means for providing a signal representative of a predetermined alarm condition. In such cases the latching relay means may include switch means that are closed by activation of the latching relay means to connect the energizing means with latching relay means. As a result, a signal produced by the energizing means during the timing output period maintains the latching relay means in an activated state. The latching switch means are open when the latching relay means are deactivated to connect the energizing means with the alarm means such that the alarm means are activated in response to a signal representative of the predetermined alarm condition. The energizing means may include primary timing means that are responsive to the engagement means for providing, after a predetermined timed period, the alarm signal to one of the latching relay means and the alarm means.

The keyless entry system of this invention may be utilized with a variety of doors. These include both motor vehicle doors and residential and commercial building doors. For motor vehicles, the energizing means may include a driver's seat switch that is responsive to occupation of the driver's seat for connecting a power source with one of the alarm means and the latching relay means to provide the predetermined alarm condition signal thereto. The energizing means may also include ignition switch means, which are selectively closed for connecting a power source with one of the alarm means and latching relay means to provide the predetermined alarm condition signal thereto. The system may also include a starter relay that is energized in response to activation of the latching relay means and includes contacts that are closed by energization of the starter relay means to electrically interconnect the car's ignition system with its starter solenoid. The starter relay contacts are open when the relay is de-energized to disconnect the ignition switch from the starter solenoid. The means for latching may include a bypass switch that is selectively activated for connecting a power source to the latching relay means to maintain the latching relay in an activated state.

DISCLOSURE OF PREFERRED EMBODIMENTS

Other objects, features and advantages will occur from the following description of preferred embodiments and the accompanying drawings in which.

Figure 1:
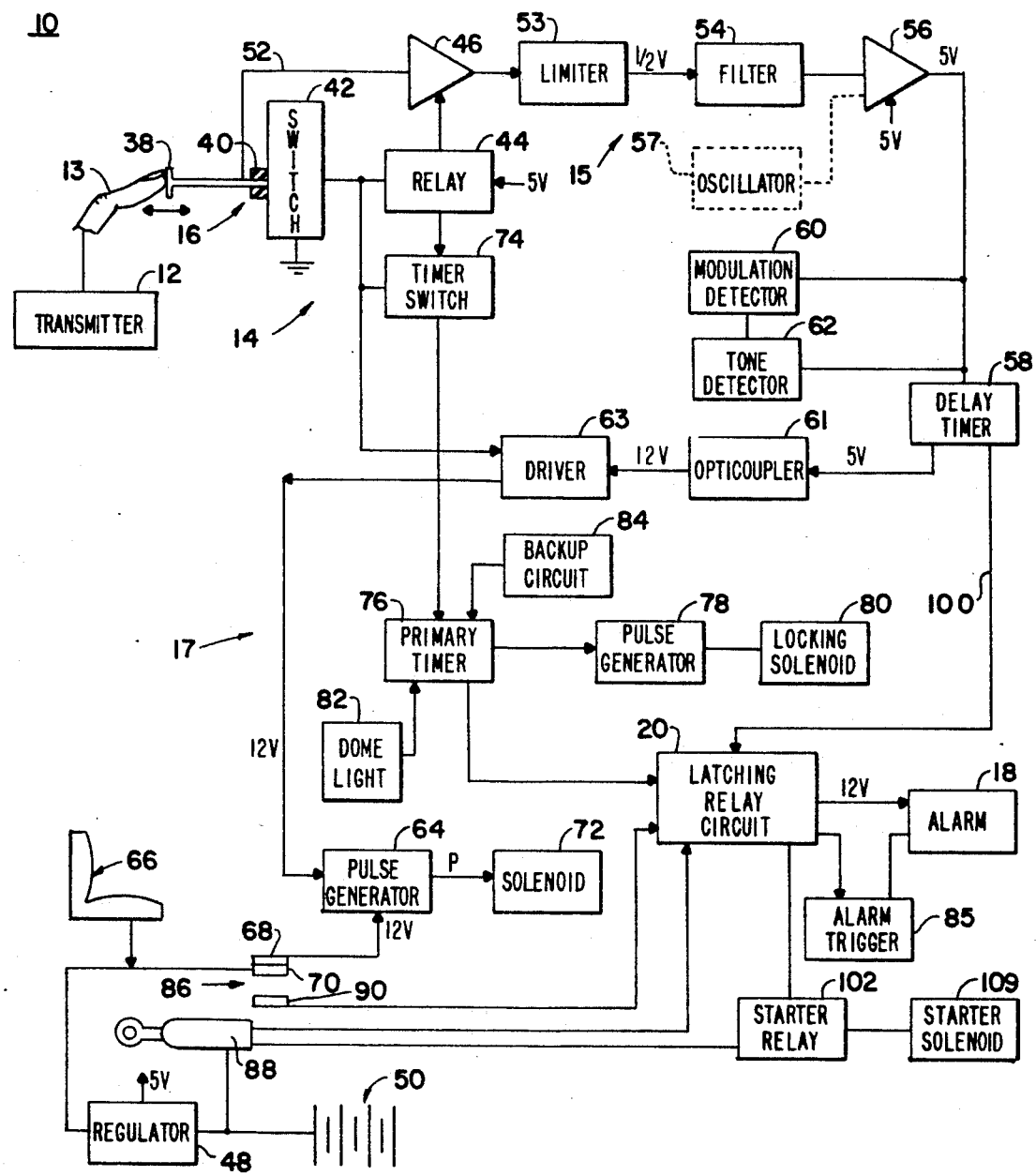
FIG. 1 is a schematic diagram of a preferred keyless entry system used for a motor vehicle according to this invention.

There is shown in FIG. 1 a keyless entry system 10 for a locked automobile door. Although the system is shown in use for the door in a motor vehicle, all or part of the system may alternatively be utilized for various other types of doors. The system includes a signal generating transmitter 12 that is carried by a person 13. In FIG. 1, only the person's finger is shown. There is a receiver circuit 14 that includes a detector circuit 15 for detecting signals generated by transmitter 12 and an engagement circuit 16 that selectively energizes the detector circuits 15 when engaged by person 13. An unlocking circuit 17 operates to unlock the car door in the manner described more fully below. An alarm circuit 18 is employed for sounding an alarm when predetermined alarm conditions are sensed and a latching relay circuit 20 is utilized as described below to prevent alarm 18 from sounding under certain circumstances.

Figures 2, 3:
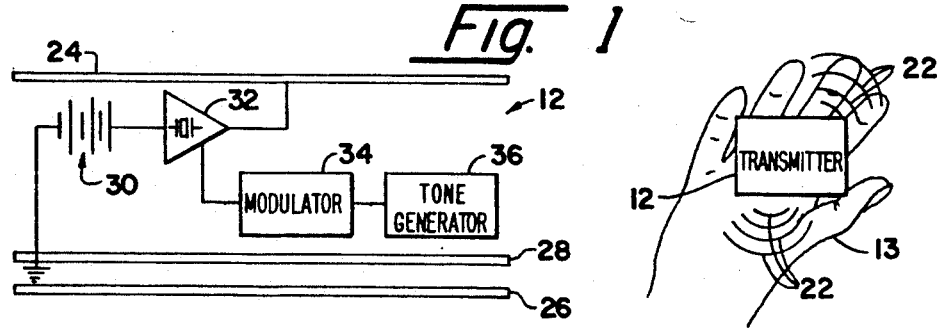
FIG. 2 is an isometric view of one preferred signal generator.
FIG. 3 is a schematic view of the signal generator of FIG. 2.

As shown in FIG. 2, transmitter 12 is generally the size of a credit card so that it fits conveniently on person 13. The transmitter 12 may be held in the person's hand or, preferably, may be disposed in a pocket or elsewhere in the person's clothing or in an item carried by the person, such as a wallet, purse or handbag such that an electrically insulating medium (e.g. air, leather, fabric, etc.) separates the transmitter and the user's skin. During operation, transmitter 12 generates an output signal 22 which is transmitted across the insulating medium and through the carrier's body and is employed by the system to unlock the car doors as described more fully below.

As shown in FIG. 3, transmitter 12 includes a support having an upper plate 24 and a lower plate 26, which is electrically isolated from plate 24 by a spacer 28. A battery 30 having approximately 3 volts is grounded to lower plate 26. That battery powers a crystal oscillator 32 which has its output connected to upper plate 24. Oscillator 32 is selected to provide a stable output signal having a frequency of typically between 10,000 Hz and 10 MHz. Typically, the frequency generated by oscillator 32 is quite stable and will not vary up or down by more than 5 Hz. The upper and lower plates are composed of a conductive metal, such as silver or copper. The spacer plates 28 may be composed of insulating material. Plates 24 and 26 may include a metal material which is cut to the tune the signal generated by transmitter 12. The frequency characteristic of the signal generated by oscillator 32 may be affected by a pulse or frequency modulator 34 and a tone generator 36. The operation of these elements will be described more fully below.

Engagement circuit 16, FIG. 1, includes a contact button 38 that is mounted in the car door (not shown) proximate the door handle. Contact 38 typically includes a conductive metal material and it is insulated from the metal parts of the door by an insulating material 40. Contact 38 operates a normally open primary microswitch 42, which in turn controls a power relay 44. Normally, contact 38 is biased to extend out of switch 42 so that the switch remains open. However, when contact 38 is engaged and pressed inwardly by person 13, switch 42 is closed. This grounds power relay 44 and allows the relay to deliver a five volt signal to amplifier 46 of circuit 15. As a result, the amplifier and the detection circuit 15 are energized. The 5 volt input, and all other 5 volt inputs described herein, are provided by a 5 volt regulator 48 which derives the 5 volts from the conventional 12 volt battery 50 of the automobile.

With detector circuit 15 energized, output signals generated by transmitter 12 are transmitted through person 13, metallic contact 38 and line 52 to an input of amplifier 46. Because the body serves as an antenna, the transmitter is capable of providing a fairly weak, continuous signal without rapidly draining the battery. This allows the transmitter to operate continuously. It does not have to be searched for and turned on as the vehicle is approached. The signal which is delivered to amplifier 46 will include not only the desired frequencies from oscillator 32 but also any other signals which may be generated by a transmitter carried on the body of person 13, as well as background noise. Amplifier 46 delivers an output to limiter 52 which limits the voltage of the signal to under ½ volt, peak to peak. Limiter 52 may comprise a pair of diodes. The output from limiter 52 is received by a filter 54 which may comprise a crystal or other narrow bandpass filter. Filter 54 is selected or tuned so that its output frequency precisely matches the frequency of signal generating crystal 32. As a result, the receiver crystal 54 acts as a filter and produces an output signal only in response to those signals having a frequency characteristic that matches that of the signal generated by oscillator 32. Because the input voltage to crystal 54 is limited to ½ volt, the crystal does not overload.

If crystal 54 detects an input frequency which is relatively close (i.e. plus or minus approximately 5 cycles) to that of its tuned frequency, it passes that signal to amplifier 56, which raises the output voltage from filter 54 to approximately 5 volts. This tuned output signal is then delivered to a delay timer 58. If the modulator 34 and tone generator 36, shown in FIG. 1, are employed, the output signal may be further screened by a modulation detector 60 and a tone detector 62, as described more fully below. Upon receiving this input signal, delay timer 58 commences timing for a predetermined period of, for example, 45 seconds. If also provides a 5 volt output to an opticoupler 60, which increases the output signal to 12 volts. This output is provided to a pulse generator driver circuit 62, which is activated by power relay 44 when contact 38 is engaged. Driver circuit 62 provides a 12 volt output signal to pulse generator 64. When the driver's seat 66 is unoccupied (which is typically the case when unlocking the door) a pair of seat switch contacts 68 and 70 are closed so that pulse generator 64 is electrically connected to, and receives a 12 volt signal from battery 50. In this state, the arrival of the signal from driver circuit 62 causes pulse generator 64 go generate a pulse p, which operates electric door solenoid 72 to unlock the previously locked door.

When contact 38 is engaged to close switch 42, this further causes power relay 44 to actuate timer switch circuit 74. As a result, circuit 74 generates an output, which is delivered to primary timer 76. This causes timer 76 to begin timing out for a period of, for example, 15 seconds. At the end of this timed period, timer 76 delivers a signal to pulse generator 78. This causes the pulse generator to generate a pulse, which operates locking solenoid 80 to relock the door which has previously been unlocked by solenoid 72. As a result, the doors are automatically relocked after the user enters the car and drives away. Alternatively, the doors are automatically relocked after 15 seconds if the user is distracted or leaves the vehicle without opening the door.

In certain circumstances, this delayed relocking feature is not immediately needed or desired. For example, while the user is getting into the case seat and getting adjusted therein, he may leave the car door open. While it is open the dome light is on and dome light circuit 82 hold timer 76 on so that the time does not time out and deliver an operating signal to pulse generator 78. Alternatively, locking may be desired immediately. For example, when the car is shifted in or through reverse, the backup lamp circuit 84 delivers a signal to the primary timer, which causes the timer to time out immediately so that the relocking occurs immediately.

In operation, the signal generating oscillator 32 and the signal detecting filter 54 are selected so closely match. When a person carrying transmitter 12 presses contact 38, filter 54 receives signals from oscillator 32 and provides a resultant signal which unlocks the car's doors. After a predetermined time and/or under predetermined conditions, the doors are automatically relocked, as described above.

Security is enhanced further by the use of a frequency or pulse modulator 34, FIG. 3. This modulates the signal generated by oscillator 32 at a given rate. Modulator detector 60, FIG. 1, is selected to detect that predetermined shift in the frequency. If such a shift is not detectable, a signal will not be delivered to delay timer 58 and the circuit 17 will not unlock the door.

Still further security is added by the use of tone generator 36 and tone detector 62. The tone generator generates a selected frequency within the modulated frequency range. Tone detector 62 is set to detect only that selected frequency. If the selected frequency within the modulated frequency range is not detected, no activating signal is sent to timer 58. In embodiments wherein a digital pulse output signal is used, a pulse counter may be substituted for the tone detector.

In certain embodiments, security is increased still further by employing a 2 Hz oscillator 57. In such embodiments, the amplifier 56 is held on for intervals of approximately ¼ second and then the amplifier is disabled for approximately ¼ second. A signal is provided by oscillator 57 through amplifier 56 only if the filter 54 detects the tuned frequency during the ¼ second window for which the amplifier is held on. If no matching frequency is sensed and the door is not unlocked within three seconds thereafter the alarm sound for 30 seconds as more fully described below. Each of these additional features, including the modulator, the tone and pulse generators and detectors and the blinking LED oscillator improve the security of the system by limiting the ability of a thief to circumvent the system through the use of a sweep generator.

Figure 4:
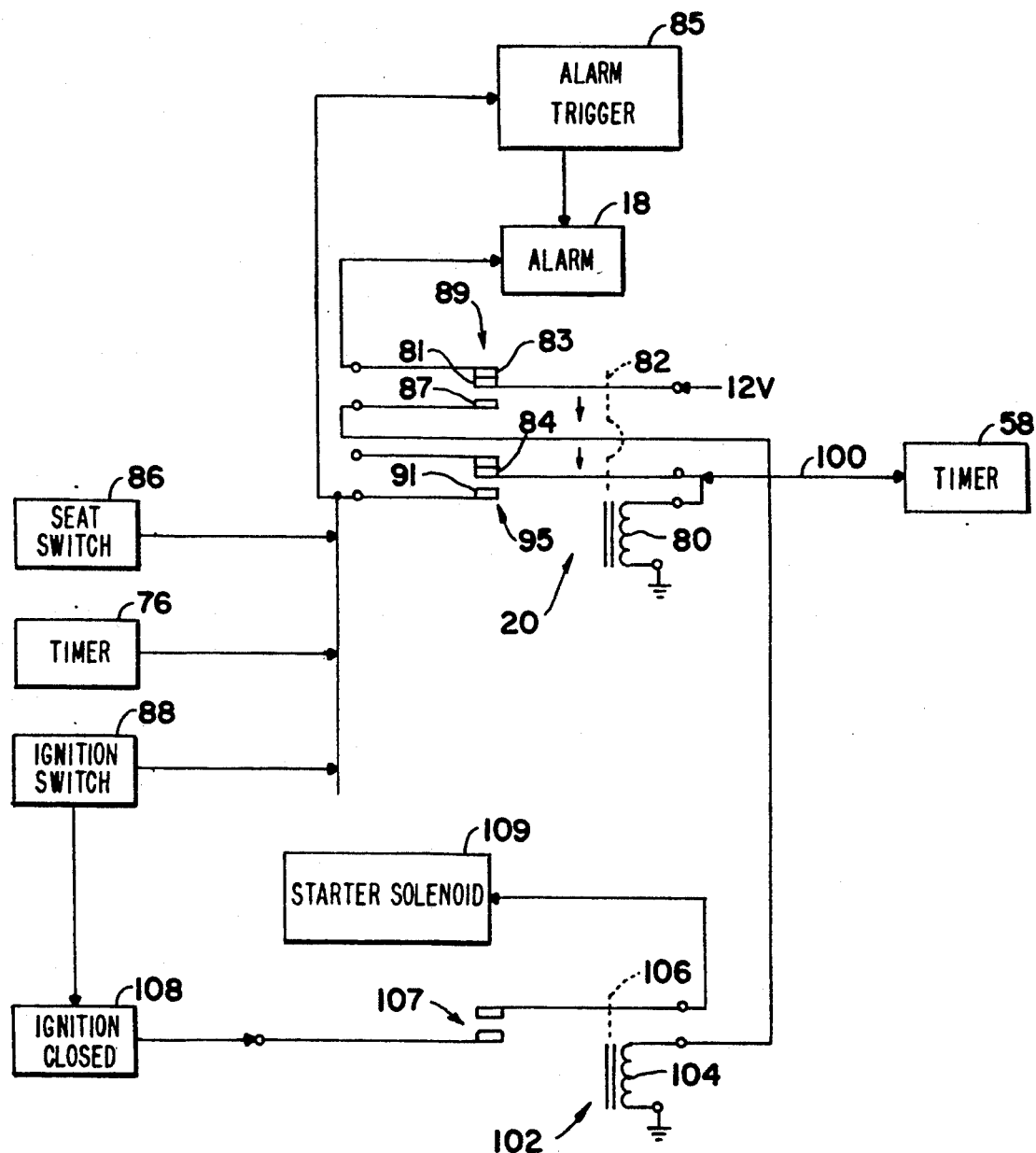
FIG. 4 is a schematic view of the alarm and latching circuits.

If a thief attempts to tamper with the system or otherwise gain unauthorized entry into the vehicle without the appropriate signal generating transmitter, alarm 18 is sounded. The alarm and alarm control system are constructed in the following manner. As shown most clearly in FIG. 4, alarm 18 is selectively connected through a pair of contacts 81 and 83 of switch 89 to a 12 volt power supply. Alarm 18 is driven by an alarm trigger circuit 85, which is itself operated upon receipt of a signal which represents a predetermined alarm condition. For example, if contact 38 is pressed by a person who either does not possess a transmitter 12 or whose transmitter does not provide a signal which matches the frequency of detecting filter 54, no signal is sent to delay timer 58 and the doors do not unlock. Nonetheless, primary timer 76 is operated in the manner previously described and, after 15 seconds, timer 76 sends a signal to alarm trigger 85. After approximately three additional seconds the alarm trigger generates a signal, which activates the alarm 18. That alarm sounds for approximately 30 seconds, during which time an intruder is likely to be frightened away.

If, alternatively, the intruder breaks in through a window or a convertible top and the timer 76 is not initialed, signals for activating the alarm trigger may be provided by either seat switch 86 or ignition switch 88. For example, if the intruder enters the car without unlocking the door and sits into the driver's seat 66, contacts 70 and 90 of driver's seat switch 86 close. As a result, a signal is provided from switch 86, FIGS. 1 and 4, to alarm trigger 85 and this causes alarm 18 to be sounded. Alternatively, if the intruder closes the ignition switch 88 to start the engine without properly unlocking the door, a signal is provided from battery through closed switch 88 to alarm trigger 85 and from there to alarm 18.

When the vehicle is properly entered utilizing transmitter 12, the operator, in most cases, desires to disarm the alarm or at least deactivate it long enough so that he may enter the vehicle quietly. Latching relay 20 serves to hold alarm 18 in a deactivated state. Relay 20 includes a relay coil 80, an armature 82 that is operated by the coil and a pair of switches, including alarm switch 89 and a latching switch 95. Switch 89 includes a fixed contact 83 and a moveable contact 81 that is opened and closed relative to contact 83 by armature 82. Switch 95 likewise includes a fixed contact 91 and a moveable contact 84 that is opened and closed by the armature relative to contact 91. The relay operates as follows.

When detection filter 54 senses a matching signal from oscillator 32 and the modulation and tone of that signal are approved by detectors 60 and 62, an input is received by timer 58. In addition to producing an output for unlocking the door, as previously described, timer 58 provides a second output over line 100, FIGS. 1 and 4, to latching relay circuit 20. This output activates relay coil 80, which draws armature 82 downwardly so that contact 81 separates from contact 83. As a result, alarm circuit 18 is disarmed. At the same time, contact 84 is drawn into engagement with contact 91. This connects timer 76 and switches 86, 88 and 99 with relay coil 80. If, during the 45 second timing period of timer 58, either of these energizing sources provides a signal, that signal is delivered through latching switch 95 to coil 80. As a result, coil 80 remains energized even after timer 58 completes its timing. This causes armature 82 to hold alarm contact 81 and 83 in an open, latched state so that the alarm cannot be sounded.

The above described latching system prevents the alarm from sounding under various conditions. For example, if timer 76 completes its 15 second timed period while delay timer 58 is still timing out, this indicates that an appropriate transmitter 12 has been utilized to open the door. Therefore, an alarm is not required and the alarm is latched. Under certain circumstances however, timer 76 may not time out until after the 45 second period of timer 58. This may occur for example if the door is held open and dome light 82, FIG. 1, remains on. To prevent sounding of the alarm after the door is closed, the alarm is alternatively latched by a signal from either of switches 86 or 88. If the operator has used transmitter 12 to enter the car and sits on seat 66, FIG. 1, contacts 70 and 90 of switch 86 close and a 12 volt signal is sent to relay circuit 20. If this occurs while timer 58 is still timing out, the 12 volt signal is provided to coil 80 thereby holding the alarm in a latched, deactivated state. Similarly, if ignition switch 88 is activated while timer 58 is still running, a 12 volt signal is provided to keep the coil 80 activated and alarm 18 latched open after a timed period. The alarm may be optionally disarmed by a bypass switch 99.

When armature 82 is operated to separate contacts 81 and 83, contact 81 is brought into engagement with starter contact 87. This delivers a 12 volt signal to starter relay 102. Coil 104 of relay 102 is activated so that latch 106 closes switch 107. As a result, when ignition switch 88 is closed, as shown in box 108, a signal is provided to the starter solenoid 109 to start the engine. Alternatively, if alarm 18 is armed, contacts 83 and 87 remain open. As a result, starter relay 102 is deactivated, switch 107 remains open and no signal can be provided to the starter solenoid. This provides further deterrent to theft of the vehicle.

Figure 5:
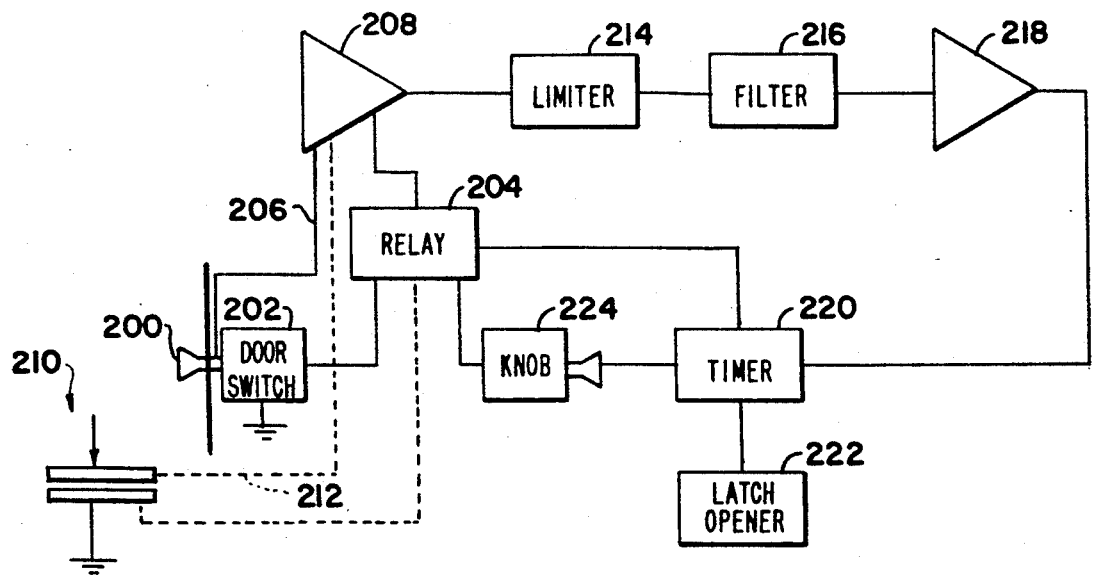
FIG. 5 is a schematic view of an alternative embodiment of the keyless entry system as used for a building door.

In alternative embodiments, such as shown in FIG. 5, the system of this invention may be used for the door of a residential or commercial building. Again, the user carries a transmitter as described in the prior embodiment. As he turns knob 200 (which is insulated by a potting material) a door switch 202 is closed. This grounds power relay 204 which activates amplifier 208. This permits the signal generated by the transmitter to pass through door knob 200 and line 206 to amplifier 208. Alternatively, the signal may be provided through a floor mat switch 210 that is closed when the user steps on the floor mat. Switch 210 similarly permits relay 204 to activate amplifier 208 so that the generated signal is transmitted through line 212 to amplifier 208.

An output is provided from amplifier 208 to limiter 214. A filter detector 216 is tuned to the predetermined frequency generated by the transmitter. Upon receipt of a signal having the predetermined frequency characteristic, filter 216 passes the signal to amplifier 218. Timer 220 responds to an output from amplifier 218 and after a predetermined timing period (e.g. 5 seconds), timer 220 provides an output signal to an electric door latch opening device 222, typically including a solenoid, which opens the door. Inside door knob 224 is connected directly to timer 220 so that the door may be opened from the inside without the transmitter. Alarms and other features may be utilized in a manner analogous to the prior embodiment.

Figure 6:
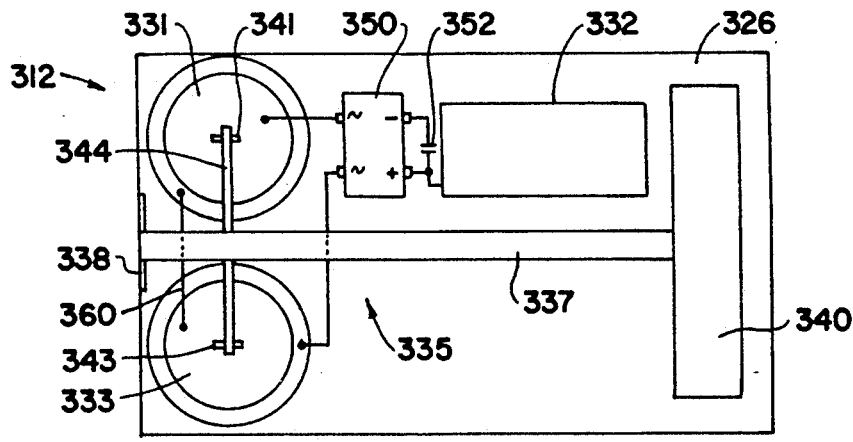
FIG. 6 is a top, partly schematic view of an alternative preferred signal generator.
Figure 7:
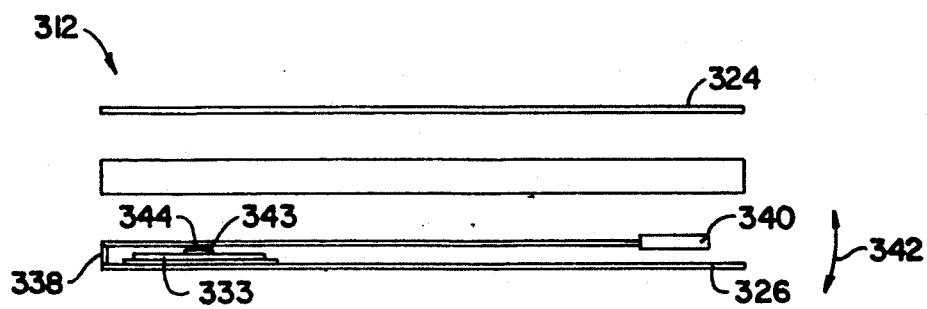
FIG. 7 is an exploded side view of the signal generator of FIG. 6.
Figure 8:
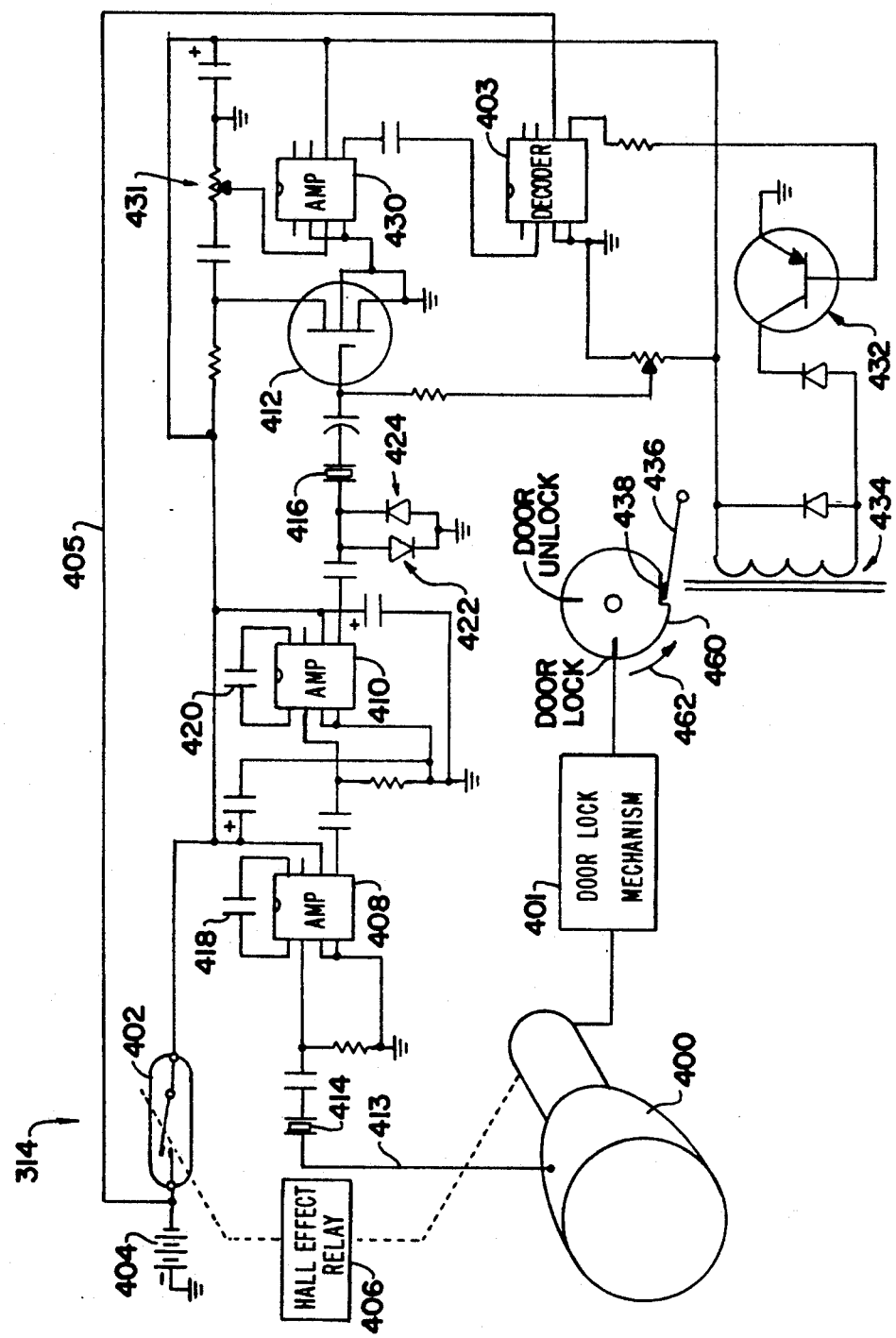
FIG. 8 is a schematic view of an alternative preferred receiver circuit according to this invention.

An alternative preferred keyless entry system is shown in FIGS. 6-8. More particularly, FIGS. 6 and 7 disclose the transmitter 310 and FIG. 8 discloses the receiver circuit 312.

Transmitter 312 includes a support structure comprising upper and lower mounting plates 324 and 326, respectively. Plates 324 and 326 are separated by a spacer 12 that is formed along the periphery of the plates. This feature is omitted from FIG. 6. for clarity. Each plate includes a copper clad printed circuit board. The copper foil side of each board is placed so that it faces outwardly; i.e., in FIG. 7 the copper foil side of board 324 faces upwardly and the foil side of board 326 faces downwardly.

A crystal controlled oscillator and modulator 332, as previously described, is mounted between plates 324 and 326. As in the prior embodiment, this oscillator provides the transmitted signal. However, in this embodiment, it is self-powered without the use of batteries. Such power is generated by piezoelectric bender means that are mounted in the space between plate 324 and 326. More particularly, a pair of bendable piezoceramic wafers or disks 331 and 333 are mounted and grounded to lower plate 326. A driver mechanism 335 is provided for periodically deflecting piezoceramic elements 331 and 333 such that they vibrate to provide an alternating voltage that powers the transmitter 312. Driver 335 includes an elongate cantilever element 337 that is typically composed of a resilient metallic or plastic material. One end of element 337 is connected to lower plate 326 by a hinge 338 that holds cantilever 337 between plates 324 and 326. A weight or mass 340 is secured to the opposite end of element 337. Cantilever element 337 employs spring steel or similar resilient material that tends to oscillate, as indicated by double-headed arrow 342, when mass 340 is disturbed. Such motion is caused by virtually any movement of transmitter 312. This may occur when the user walks or otherwise causes the transmitter to move. The material in element 33 is flexible enough to permit the element to oscillate easily, but is rigid enough to prevent the element 337 or the mass 340 from striking plates 324 and 326.

A pair of insulated spacers 341 and 343 are mounted generally centrally in respective piezoceramic elements 331 and 333. These spacers are themselves interconnected by a shaft 344 that extends generally between the spacers. In alternative embodiments, this shaft may comprise a wire. Cantilever element 337 extends transversely across and bears against shaft 344, generally between the piezoceramic elements 331 and 333. As a result, when element 337 bends downwardly, it urges shaft 344 in a similar direction. This causes spacers 341 and 343 to deflect elements 331 and 333, respectively, in a downward direction. Before mass 340 engages plate 326 the resilience of cantilever element 337 causes the weighted end to reverse direction and move generally upwardly. As a result, elements 331 and 333 are pulled upwardly until the driver reaches the upper end of its travel short of plate 324. The cantilever then reverses direction again and moves downwardly so that disks 331 and 333 are deflected downwardly. This cycle continues for as long as the user walks or otherwise causes transmitter 312 to move. The reciprocating movement of driver 335 in the direction of arrow 342 causes the piezoceramic disks 331 and 333 to vibrate or oscillate so that a continuous source of alternating voltage is generated.

Disks 331 and 333 are connected in series by a wire 360. As a result, an enhanced output voltage is provided by the piezoceramic disks. This output is applied across a full wave bridge rectifier 350 to oscillator 332. Rectifier 350 converts the alternating voltage generated by the disks into a direct current voltage that drives oscillator 332. A capacitor 352 stores voltage that may be used to drive oscillator 332 when the piezoceramic disks 331 and 333 have ceased vibrating. This may occur if movement of transmitter 312 ceases. Capacitor 352 may have, for example, a sufficient capacitance such that oscillator 332 is driven to transmit a signal from about 30 seconds to 1 minute after the piezoceramic disks 331 and 333 cease generating an output voltage. The output of oscillator 332 is connected to upper plate 324, which plate serves as an antenna for the oscillator.

A self-powered transmitter, as described above, provides significant advantages over a battery-powered transmitter. Battery powered units require maintenance, recharging and/or replacement. If a battery fails at an inopportune time and replacement batteries and not available, the system may be rendered inoperable. The present system overcomes these difficulties. Batteries do not have to be replaced and the system remains virtually continuously charged. Even if it is temporarily discharged because of lack of motion, it may be quickly and conveniently recharged by simply moving the transmitter.

Receiver circuit 314, FIG. 8, includes a metallic door knob 400 that is engaged by a person carrying the transmitter 312. The knob is alternately locked and unlocked by a door lock mechanism 401, which, may include solenoids, latches and other appropriate means for locking and unlocking the door. The door lock mechanism 401 is operated to lock the door when a wheel mechanism 460 is rotated in the position shown in FIG. 8. By rotating the wheel mechanism in the direction of arrow 462 to a second "door unlock" position, the door lock mechanism is operated to unlock the door. Circuit 314 is activated to operate wheel mechanism 460 in the following manner.

A battery 404 provides a continuous operating voltage to a decoder 403 through a line 405. Decoder 403 stores in its memory a signal pattern or frequency characteristic that matches the particular pattern transmitted by transmitter 312. Battery 404 is also selectively connected to the remaining components of receiver circuit 314 by a magnetic reed switch 402. Before the user engages door knob 400, switch 402 is opened. As a result, the components of receiver 314, with the exception of decoder 403, remain deactivated. When a person equipped with transmitter 312 turns knob 400, switch 402 is closed, for example by a Hall effect relay 406 or similar means, so that power is provided from battery 404 to the remainder of receiver 314. In particular, low voltage audio amplifiers 408, 410 and 430 as well as FET 412 are activated by the battery.

Receiver circuit 314 employs a pair of crystal filters 414 and 416 that are tuned to the predetermined frequency generated by transmitter 312. More particularly, the filters limit the band width to approximately plus or minus 3 Hz. Amplifiers 408 and 410 are connected between filters 414 and 416. Capacitors 418 and 420 are connected to amplifiers 408 and 410, respectively. As a result, each amplifier is provided with a predetermined gain of, for example, 200.

When a person carrying transmitter 312 turns door knob 400, the amplifiers 408 and 410 are activated and the generated signal is transmitted over line 413. Crystals 414 and 416 allow only a signal within the predetermined frequency range to pass. Accordingly, amplifiers 408 and 410 amplify only that signal and do not amplify unwanted noise. This allows the amplifiers to utilize a significantly higher gain than may be employed for an unfiltered signal. The system disclosed in FIGS. 6-8 preferably employs a frequency range between 10,000 and 50,000 Hz. Because a very small range of frequencies is amplified by amplifiers 408 and 410, a gain of approximately 40,000 may be obtained between the input of amplifier 408 and the output of amplifier 410.

Diodes 422 and 424 serve as a limiter to prevent overloading of FET 412. That element provides a further gain of approximately 4. FET 412 may comprise a BS 170 FET or a similar element. The signal from FET 412 is further amplified by amplifier 430. This component has a variable gain that is adjusted by variable resistor 431. Typically, a maximum gain of approximately 20 is provided by amplifier 430.

The amplified signal is provided by amplifier 430 to decoder 403. When the decoder senses a signal pattern that matches the pattern stored in its memory it energizes transistor 432. This transistor is employed as a switch to energize a relay 434. Before relay 434 is activated, its armature 436 engages a notch 438 in the circumference of wheel mechanism 460 so that the wheel mechanism is prevented from turning and is held in the "door lock" position. When a signal having a predetermined frequency characteristic is detected, however, relay 434 is activated to draw armature 436 out of notch 438. As a result, wheel mechanism 460 is allowed to turn in the direction of arrow 462. This turning may be caused by various means such as a spring bias or by the operator turning the knob 400. In either event, when the wheel mechanism 460 turns to the "door unlock" position, the door is unlocked and access is permitted through the door. Alarms, timers and other features disclosed in the prior embodiments may also be used in this embodiment.

As the signal generated by transmitter 312 crosses the insulating medium and then the user's body, the strength of the signal is weakened considerably. Notwithstanding this, because of the extremely high gain exhibited by receiver 314, that circuit is capable of successfully detecting the extremely weak signal from transmitter 312. Transmitted signals on the order of approximately 1 volt peak to peak may even be employed. Because the system operates so successfully on such a low power requirement, it may be kept quite compact and the inconvenience of installing and replacing higher powered batteries is eliminated. Moreover, the use of such a low power transmitter and a high gain receiver allows the user to carry the transmitter in a bag, pocket or briefcase with out having to directly contact the user's skin. This further enhances the convenience of the system.

Accordingly, the present invention allows the user to quickly and reliably open a locked door or access other items without the need for fumbling with keys and without having to memorize detailed codes or operating digitally coded devices. Because the operator's body serves as the transmitter's antenna, no bulky unsightly antenna is required. At the same time, the transmitter remains continuously activated but does not require significant power so frequency battery replacement is unnecessary. Moreover, because of the various backup detection features, this system is quite resistent against the use of sweep signal generators. The alarm system further provides a convenient gut important security feature.

Although specific features of the invention are shown in some drawings and not others this is for convenience only, as each feature may be combined with any or all of the other features in accordance with this invention.

Other embodiments will occur to those skilled in the art and are within the following claims.

What is claimed is:

1. A keyless entry system for locked doors comprising:

signal generating means carried by a person and being completely separated by an electrically insulating medium from said person's skin for generating an output signal with a predetermined frequency characteristic and sufficient signal strength such that said generated signal is transmitted across said medium and through the person's body to a remote portion of the body spaced apart from said signal generating means;

receiver means including detector means having sufficient gain for detecting a signal with said predetermined frequency characteristic, and engagement means that are directly engageable by said remote portion of the person's body for providing signals transmitted through the body to said detector means; and means, responsive to said detector means, for unlocking said door when a signal having said predetermined frequency characteristic is detected.

2. The system of claim 1 in which said engagement means include primary contact means that are selectively engageable by the carrier for receiving transmitted signals therefrom, primary switch means which are operated by engagement of said primary contact means, and means, responsive to operation of said primary switch means, for electrically interconnecting said primary contact means and said detector means.

3. The system of claim 2 further including primary timing means, means, responsive to operation of said primary switch means for initiating said primary timing means, and means, responsive to timing out of said primary timing means for relocking said door.

4. The system of claim 2 in which said means for unlocking include a pulse generator, means responsive to operation of said switch means for driving said pulse generator to generate an electric pulse, and a solenoid, responsive to the generation of an electric pulse from said pulse generator, for unlocking said door.

5. The system of claim 1 in which said signal generating means include oscillator means, said output signal includes a signal with a predetermined frequency range and said means for detecting include complementary filter means for passing a generated signal within said predetermined frequency range.

6. The system of claim 1 in which said means for generating includes means for providing the signal with a predetermined modulation and said means for detecting include means for sensing received signals having said predetermined modulation.

7. The system of claim 5 in which said means for generating include means for establishing a predetermined frequency within said modulated signal and said means for detecting include means for extracting said predetermined frequency from said modulated signal.

8. The system of claim 1 in which said system includes alarm means and alarm control means for activating said alarm means in response to at least one predetermined alarm condition.

9. The system of claim 8 in which said alarm control means include means for latching said alarm means in a deactivated state for at least a predetermined time after said detector means sense a signal having said predetermined frequency characteristic.

10. The system of claim 9 further including alarm delay timing means interconnected between said detector means and said means for latching and being initiated when said detector means sense a signal having said predetermined frequency characteristic, said means for latching including latching relay means that are activated by operation of said alarm delay timing means to hold said alarm means in a deactivated state during timing out of said alarm delay timing means.

11. The system of claim 10 in which said alarm control means further include energizing means for providing a signal representative of a said predetermined alarm condition, and in which said latching relay means include latching switch means that are closed by activation of said latching relay means to connect said energizing means with said latching relay means such that a signal representative of a predetermined alarm condition produced during the timing out period maintains said latching relay means in an activate state, said latching switch means being open when said latching relay means are deactivated to connect said energizing means with said alarm means such that said alarm means are activated in response to a signal representative of a predetermined alarm condition.

12. The system of claim 11 in which said energizing means include primary timing means responsive to said engagement means for providing after a timed period said representative signal to one of said latching relay means and said alarm means.

13. The system of claim 1 in which said means for detecting include means for alternately enabling said detector means to detected said signal during a predetermined interval and disabling said detector means for a second predetermined interval if said signal is not detected during first said interval.

14. The system of claim 1 in which said detector means includes first and second filters for passing a generated signal with said predetermined frequency characteristic and amplifier means separate and distinct from said first and second filters and interconnected between said first and second filters for amplifying said signal that is passed by said first and second filters.

15. A keyless entry system for locked doors comprising:
  signal generating means carried by a person and being separated from said person's skin by an electrically insulating medium for generating an output signal with a predetermined frequency characteristic and sufficient strength such that said generated signal is transmitted across said medium and through the person's body to a remote portion of the body spaced apart from said signal generating means, said signal generating means including a support, an oscillator mounted on said support, piezoelectric generator means connected to said oscillator means, and means, responsive to movement of said support, for deflecting said piezoelectric generator means to produce a voltage, which voltage drives said oscillator to generate said output signal;
  receiver means including detector means for detecting a signal with said predetermined frequency characteristic, and engagement means that are directly engageable by said remote portion of the person's body for providing signals transmitted through the body to said detector means; and
  means, responsive to said detector means, for unlocking said door when a signal having said predetermined frequency characteristic is detected.

16. The system of claim 15 in which said means for deflecting includes a cantilever element that is resiliently mounted at a first end within said housing and has a mass attached proximate an opposite second end such that said cantilever element oscillates about said first end alternately, torward and away from said piezoelectric generator means in response to movement of said housing, and further includes an actuator disposed between said cantilever element and said piezoelectric generator means for deflecting said generator means when said cantilever element moves toward generator means.

17. A keyless entry system for locked doors comprising:
  signal generating means carried by a person and being separated from said person's skin by an electrically insulating medium for generating an output signal with a predetermined frequency characteristic and sufficient strength such that said generated signal is transmitted across said medium and through the person's body to a remote portion of the body spaced apart from said signal generating means, said signal generating means including a support, an oscillator mounted on said support, piezoelectric generator means connected to said oscillator means, and means, responsive to movement of said support, for deflecting said piezoelectric generator means to produce a voltage, which voltage drives said oscillator to generate said output signal;

receiver means including detector means for detecting a signal with said predetermined frequency characteristic, and engagement means that are directly engageable by said remote porton of the person's body for providing signals transmitted through the body to said detector means, said detector means including first and second filters for passing a generated signal with said predetermined frequency characteristic and amplifier means interconnected between said first and second filters for amplifying said signal that is passed by said first and second filters; and means, responsive to said detector means, for unlocking said door when a signal having said predetermined frequency characteristic is detected.

* * * * *